US007925845B2

(12) United States Patent
Fujimoto et al.

(10) Patent No.: US 7,925,845 B2
(45) Date of Patent: Apr. 12, 2011

(54) STORAGE APPARATUS AND MANAGEMENT UNIT SETTING METHOD

(75) Inventors: Takeo Fujimoto, Odawara (JP); Yutaka Takata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 747 days.

(21) Appl. No.: 11/968,219

(22) Filed: Jan. 2, 2008

(65) Prior Publication Data

US 2008/0263261 A1 Oct. 23, 2008

(30) Foreign Application Priority Data

Apr. 20, 2007 (JP) ................................. 2007-112121

(51) Int. Cl.
*G06F 12/00* (2006.01)
(52) U.S. Cl. ....................................................... 711/154
(58) Field of Classification Search ........................ None
See application file for complete search history.

(56) References Cited

U.S. PATENT DOCUMENTS

| 7,610,506 B2 * | 10/2009 | Arai ................................. 714/6 |
| 2005/0091455 A1 | 4/2005 | Kano et al. |
| 2008/0235448 A1 * | 9/2008 | Inoue et al. ................... 711/114 |

FOREIGN PATENT DOCUMENTS

JP    2003-015915    1/2003

* cited by examiner

*Primary Examiner* — Hiep T Nguyen
(74) *Attorney, Agent, or Firm* — Brundidge & Stanger, P.C.

(57) ABSTRACT

A storage apparatus that provides a dynamically extensible virtual volume for a host apparatus that accesses the virtual volume is characterized by including: a management unit setting part for setting a management unit, with which an area for storing data sent from the host apparatus is divided on a predetermined-area basis for management, for a pool area that provides a storage area to be assigned to the virtual volume; and a management unit resetting part for resetting the management unit set by the management unit setting part via analysis of the status of access from the host apparatus to the data at a predetermined time to make the management unit optimum for the status of access from the host apparatus to the data.

14 Claims, 17 Drawing Sheets

FIG.14
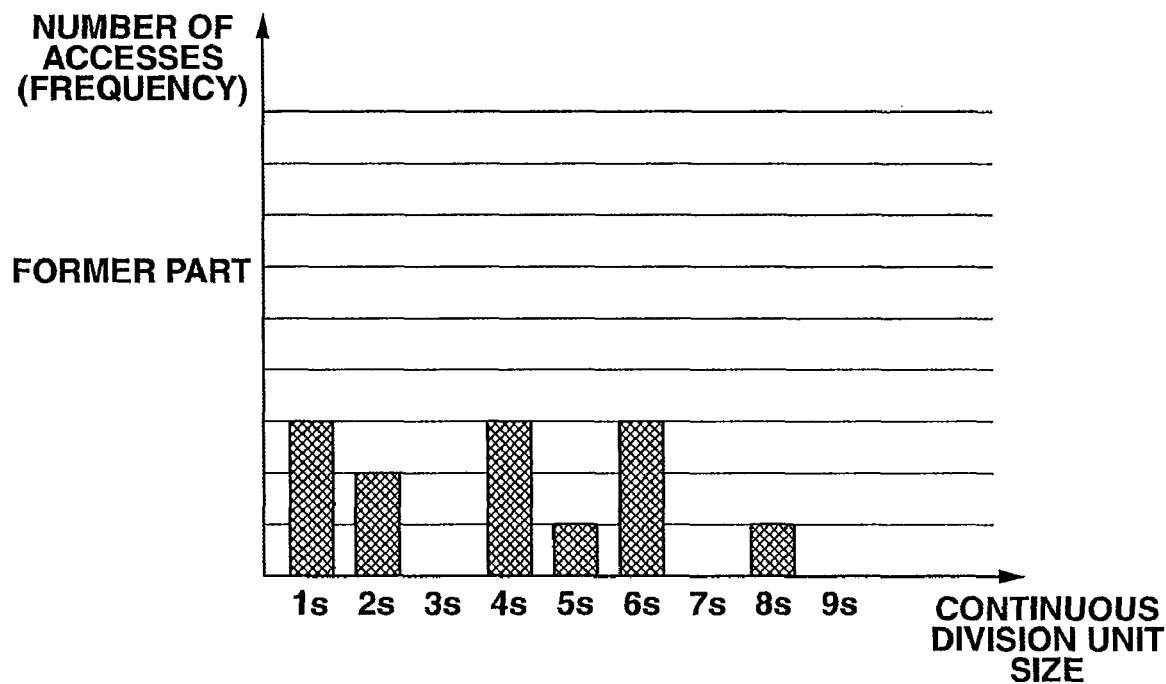
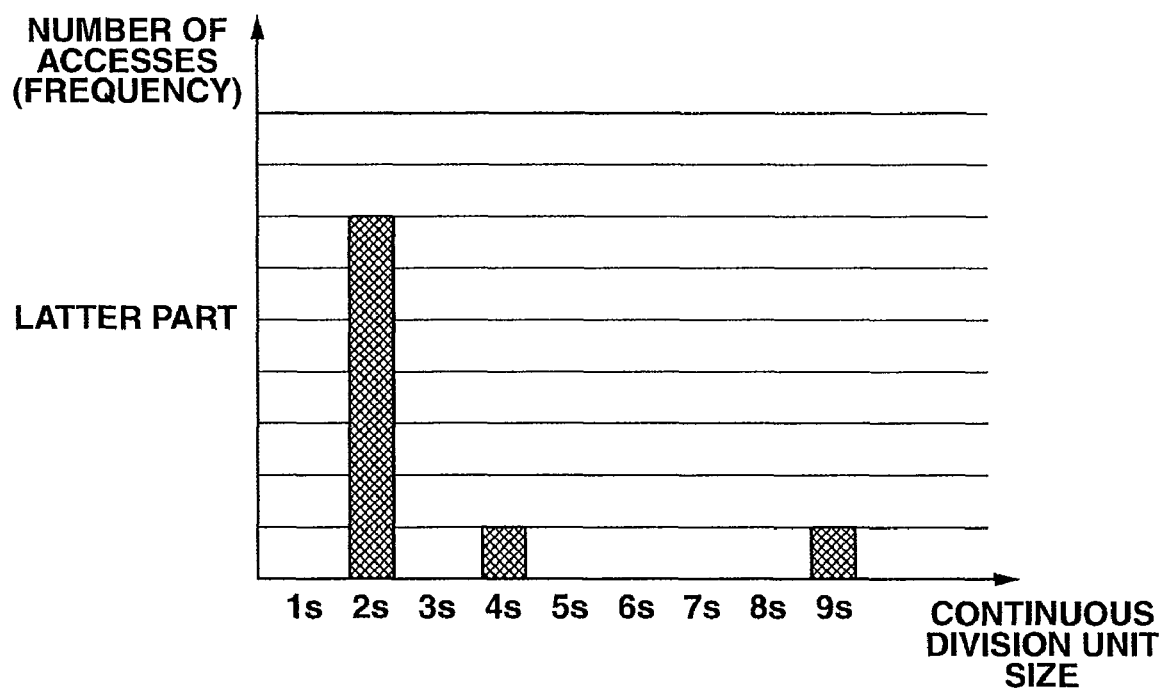

STORAGE APPARATUS AND MANAGEMENT UNIT SETTING METHOD

CROSS-REFERENCES TO RELATED APPLICATIONS

This application relates to and claims priority from Japanese Patent Application No. 2007-112121, filed on Apr. 20, 2007, the entire disclosure of which is incorporated herein by reference.

BACKGROUND

The invention relates to a storage apparatus and management unit setting method, and is suitable for use in, for example, a storage apparatus that provides a host apparatus with a storage area that can have its capacity dynamically extended.

In storage systems for storing data using a storage apparatus, there is a conventional management method in which plural hard disks are managed in an RAID (Redundant Array of Independent/Inexpensive Disks) system. At least one logical volume is formed in a physical storage area provided by multiple hard disks.

In recent years, a dynamic storage area assignment technique has being proposed in which: a host apparatus is provided with a virtual volume by plural logical volumes without creating a logical volume having fixed capacity in a storage area of a hard disk; and a storage area in each logical volume are dynamically assigned to the virtual volume in response to a request from the host apparatus (e.g., see JP2003-015915 A). Dynamic capacity extension for a virtual volume can be realized with the dynamic storage area assignment technique.

However, in the above dynamic storage area assignment technique, when a page size, which serves as a management unit for managing a storage area in a logical volume on a predetermined-area basis, is too large with respect to the actual access from a host apparatus, the page size is too large for the data stored for the page size. Thus, it is considered that a useless area increases in the storage area in the logical volume, which leads to the reduced usage efficiency of the storage area in the logical volume.

On the other hand, when the page size is too small, management information for managing the page size increases, so a large system area for storing the management information needs to be reserved. This may result in a system area insufficiency. Also when the page size is too small, the number of accesses to the management information increases. This may lead to reduced performance in the entire storage apparatus in terms of access to the host apparatus.

SUMMARY

The present invention has been made in light of the above, and an object of the present invention is to provide a storage apparatus and a management unit setting method with which usage efficiency and access performance can be improved.

In order to solve the above-mentioned problems, according to this invention, there is provided a storage apparatus that provides a dynamically extensible virtual volume for a host apparatus that accesses the virtual volume, the apparatus being characterized including: a management unit setting part for setting a management unit, with which an area for storing data sent from the host apparatus is divided on a predetermined-area basis for management, for a pool area that provides a storage area to be assigned to the virtual; and a management unit resetting part for resetting the management unit set by the management unit setting part via analysis of the status of access from the host apparatus to the data at a predetermined time to make the management unit optimum for the status of access from the host apparatus to the data.

Accordingly, the management unit set by the management unit setting part is reset so as to be optimum for the status of data access from the host apparatus to the data. Therefore, the reduced usage efficiency of the storage area in the pool area, which arises from the increased useless area in the storage area in the pool area; the insufficiency of the system area which arises from the increased management information for managing the management unit; and the reduced performance in the entire storage apparatus in terms of access to the host apparatus which arises from the increased number of accesses to the management information can be prevented effectively.

Moreover, according to the invention, there is provided a management unit setting method for a storage apparatus that provides a dynamically extensible virtual volume for a host apparatus that accesses the virtual volume, the method being characterized by including: a first step of setting a management unit, with which an area for storing data sent from the host apparatus is divided on a predetermined-area basis for management, for a pool area that provides a storage area to be assigned to the virtual volume; and a second step of resetting the management unit set in the first step via analysis of the status of access from the host apparatus to the data at a predetermined time to make the management unit optimum for the status of access from the host apparatus to the data.

Accordingly, the management unit set by the management unit setting part is reset so as to be optimum for the status of data access from the host apparatus to the data. Therefore, the reduced usage efficiency of the storage area in the pool area, which arises from the increased useless area in the storage area in the pool area; the insufficiency of the system area which arises from the increased management information for managing the management unit; and the reduced performance in the entire storage apparatus in terms of access to the host apparatus which arises from the increased number of accesses to the management information can be prevented effectively.

According to the invention, a storage apparatus and management unit setting method in which improved usage efficiency and access performance can be achieved can be realized.

BRIEF DESCRIPTION OF THE DRAWINGS

FIG. 14 is a conceptual diagram in which the statistical result on the number of accesses for each continuous division unit size is shown in chart form for each of the former part and the latter part.

DETAILED DESCRIPTION OF PREFERRED EMBODIMENTS

An embodiment of the present invention will be described below with reference to the drawings.

Figure 1:
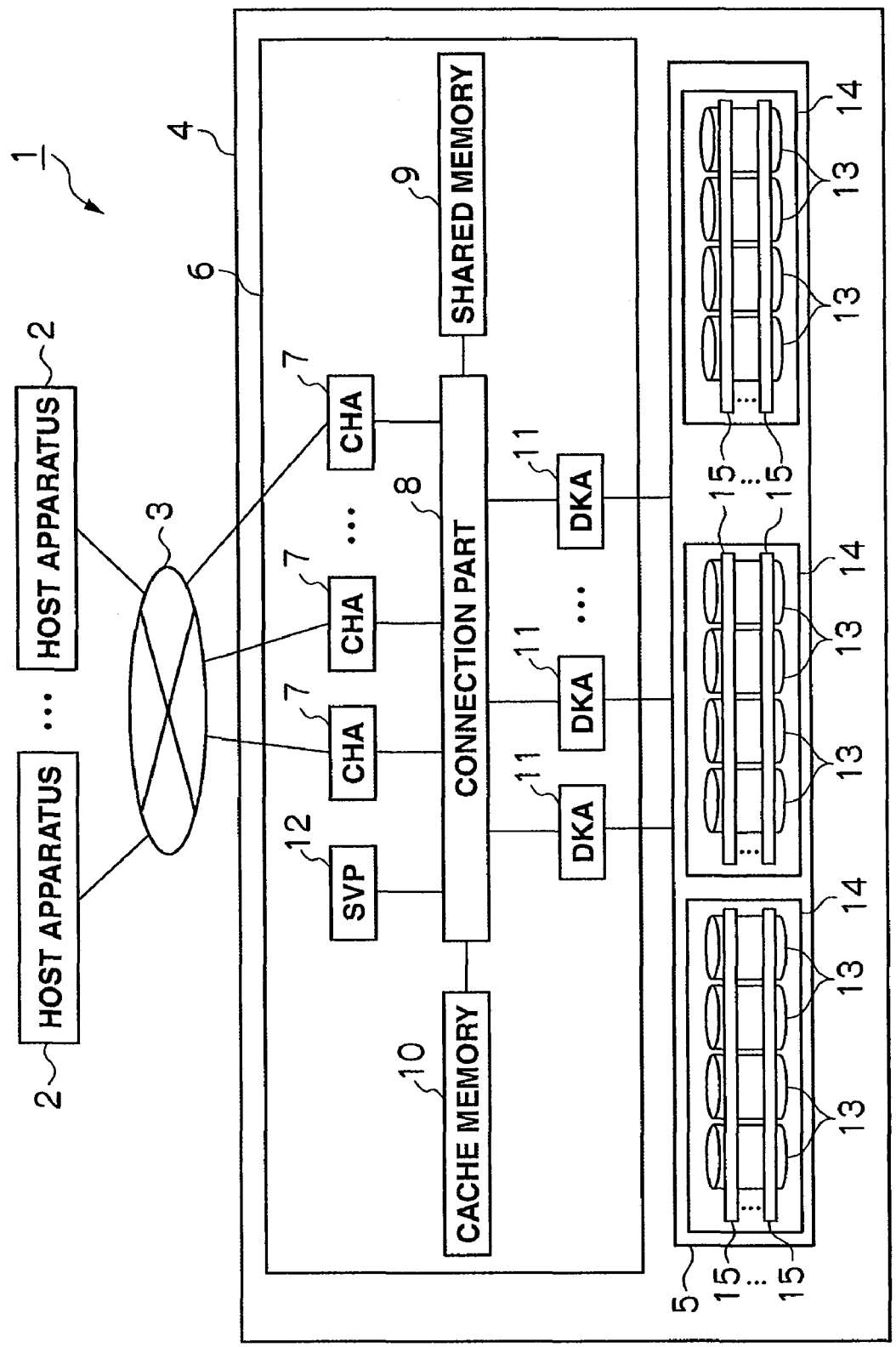
FIG. 1 is a block diagram illustrating a schematic configuration of a storage system according to an embodiment of the invention.

FIG. 1 shows a storage system 1 according to the embodiment of the invention. The storage system 1 has a configuration in which host apparatuses 2 are connected with a storage apparatus 4 via a network 3.

Each host apparatus 2 is a computer device equipped with information processing resources such as a CPU (Central Processing Unit) and memory, and is composed of, e.g., a personal computer, work station, or mainframe. The host apparatus 2 is also provided with information input devices (not shown in the drawing) such as a keyboard, switch, pointing device, and microphone and information output devices (not shown in the drawing) such as a monitor display and speaker.

The network 3 is composed of, for example, an SAN (Storage Area Network), LAN (Local Area Network), Internet, public line, or dedicated line. The communication between the host apparatus 2 and the storage apparatus 4 via the network 3 is implemented in accordance with Fibre Channel Protocol if the network 3 is a SAN, and is implemented in accordance with TCP/IP (Transmission Control Protocol/Internet Protocol) if the network 3 is a LAN.

The storage apparatus 4 is composed of a disk part 5 composed of plural hard disks (HDD) 13 and a controller 6 for managing the plural hard disks 13 in an RAID system.

The hard disks 13 are composed of, e.g., expensive disks with high access performance such as SCSI (Small Computer System Interface) disks or inexpensive disks with low access performance such as SATA (Serial AT Attachment) disks or optical disks.

The controller 6 is composed of plural channel adapters (CHA) 7, a connection part 8, shared memory 9, cache memory 10, plural disk adapters (DKA) 11, and a service processor 12.

Each channel adapter 7 is configured as a microcomputer system equipped with a micro processor (not shown in the drawing), memory (not shown in the drawing), communication interface, etc., and is provided with a port (not shown in the drawing) for having the channel adapter 7 be connected to the network 3. The channel adapter 7 interprets various commands sent from the host apparatus 2 to execute necessary processing. The port of the channel adapter 7 is assigned a network address (e.g., an IP address or WWN) to discriminate between ports, allowing each channel adapter 7 to independently act as an NAS (Network Attached Storage).

The connection part 8 is connected to not only the channel adapters 7 but also the shared memory 9, the cache memory 10, and the disk adapters 11. Moving data or commands between the channel adapters 7, the shared memory 9, the cache memory 10, and the disk adapters 11 is performed via the connection part 8. The connection part 8 is composed of, for example, a switch such as an ultrahigh-speed cross bus switch for conducting data movement via high-speed switching or a bus.

The shared memory 9 is storage memory shared by the channel adapters 7 and the disk adapters 11. The shared memory 9 is used to mainly store system configuration information, which is read from a system volume when the storage apparatus 4 is powered on, various control programs, commands from the host apparatus 2, etc. Various kinds of configuration information stored in the shared memory 9 will be described later.

The cache memory 10 is also storage memory shared by the channel adapters 7 and the disk adapters 11. The cache memory 10 is mainly used to temporarily store the data input/output to/from the storage apparatus 4.

Each disk adapter 11 is configured as a microcomputer system equipped with a micro processor (not shown in the drawing), memory (not shown in the drawing), etc., and functions as an interface for performing protocol control in communication with the disk part 5. The disk adapters 11 are connected to the corresponding disk part 5 via, e.g., a fibre channel cable, and data movement between the disk adapters 11 and the disk part 5 is conducted in accordance with Fibre Channel Protocol.

The service processor 12 is a computer device operated for maintaining or managing the storage apparatus 4, and is composed of, e.g., a notebook computer. The service processor 12 is connected to the host apparatus 2 via the network 3, and can receive data or commands from the host apparatus 2. The service processor 12 can display a report on completion of various kinds of executed processing in the storage apparatus 4 on a display screen (not shown in the drawing).

Also, in the storage system 1 according to this embodiment, every four plural hard disks 13 form a RAID group 14, and then one or more logical volumes 15 are defined in a storage area provided by the RAID group 14.

Each logical volume 15 is assigned a unique identifier (LUN: Logical Unit Number). In this embodiment, that identifier and a unique number (LBA: Logical Block Address) allocated to each block are combined to form an address, and data is input or output by designating the relevant address.

Figure 2:
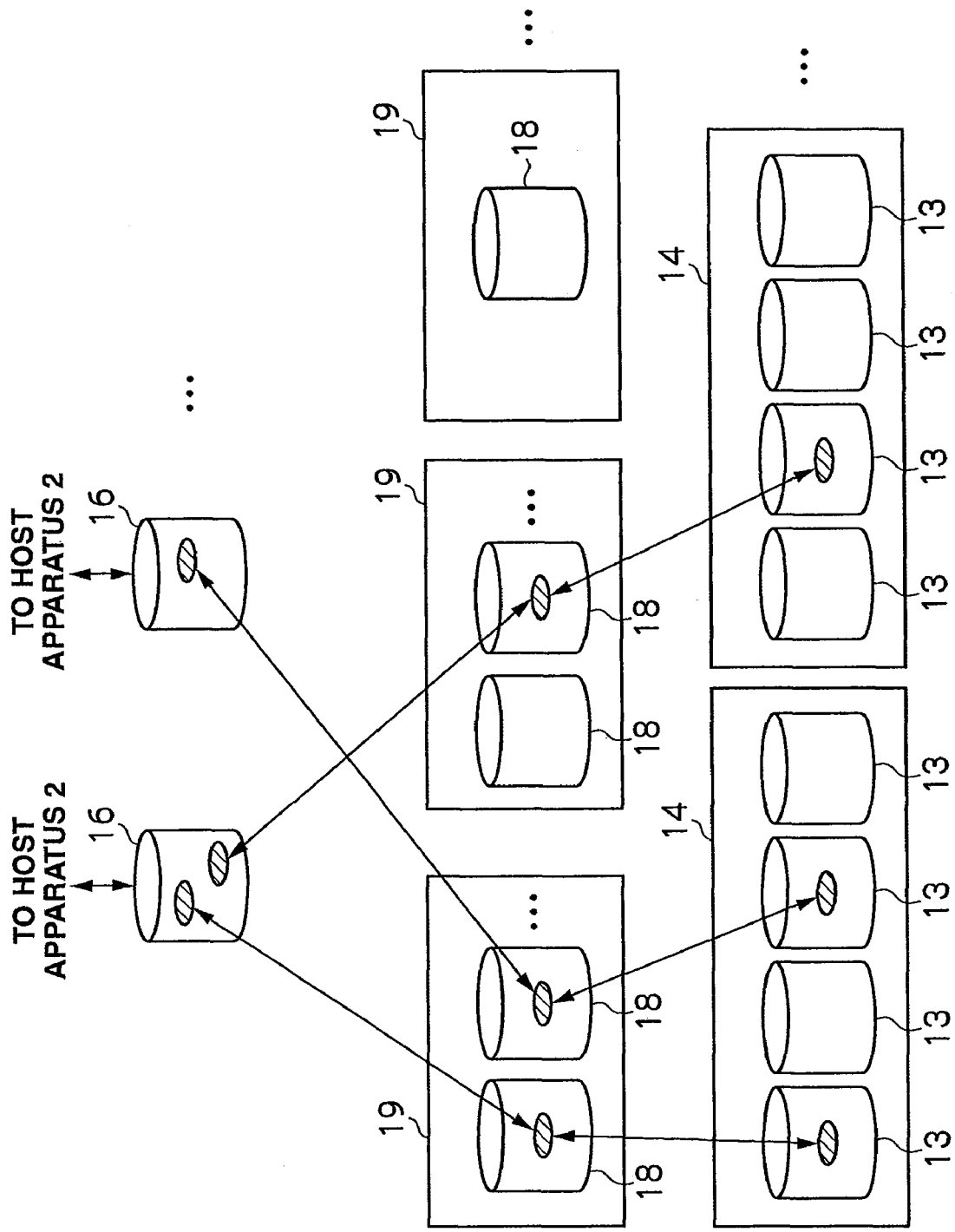
FIG. 2 is a conceptual diagram illustrating a logical configuration of plural hard disks.

FIG. 2 is a conceptual diagram showing a logical configuration for the plural hard disks 13 in the storage system 1.

In this case, in terms of attributes, the logical volumes 15 are roughly divided into virtual volumes 16, which are the logical volumes 15 accessed by the host apparatus 2; normalized volumes 17, which are used for mapping with the virtual volumes 16 and are the logical volumes 15 for actual volumes for storing data normalized in order of LBA; and pool volumes 18, which are used for mapping with the virtual volumes 16 and are the logical volumes 15 for actual volumes for storing data regardless of the order of LBA. Also, storage pools 19 each are composed of one or more pool volumes 18. Note that the normalized volumes 17 are not shown in FIG. 2.

A storage area in each virtual volume 16 is associated, as a virtual storage area, with a storage area in each pool volume 18 as a logical storage area. Also, the logical storage area in the pool volume 18 is associated with a storage area in each hard disk 13, which is an actual storage area for actually storing data (This will be described later.). Therefore, in the storage system 1, the virtual volume 16 is provided to the host apparatus 2, so the data sent from the host apparatus 2 can be stored in the actual storage area in the hard disk 13. Incidentally, a storage area in each normalized volume 17 is also associated, as a logical storage area, with the actual storage area in the hard disk 13.

Figure 3:
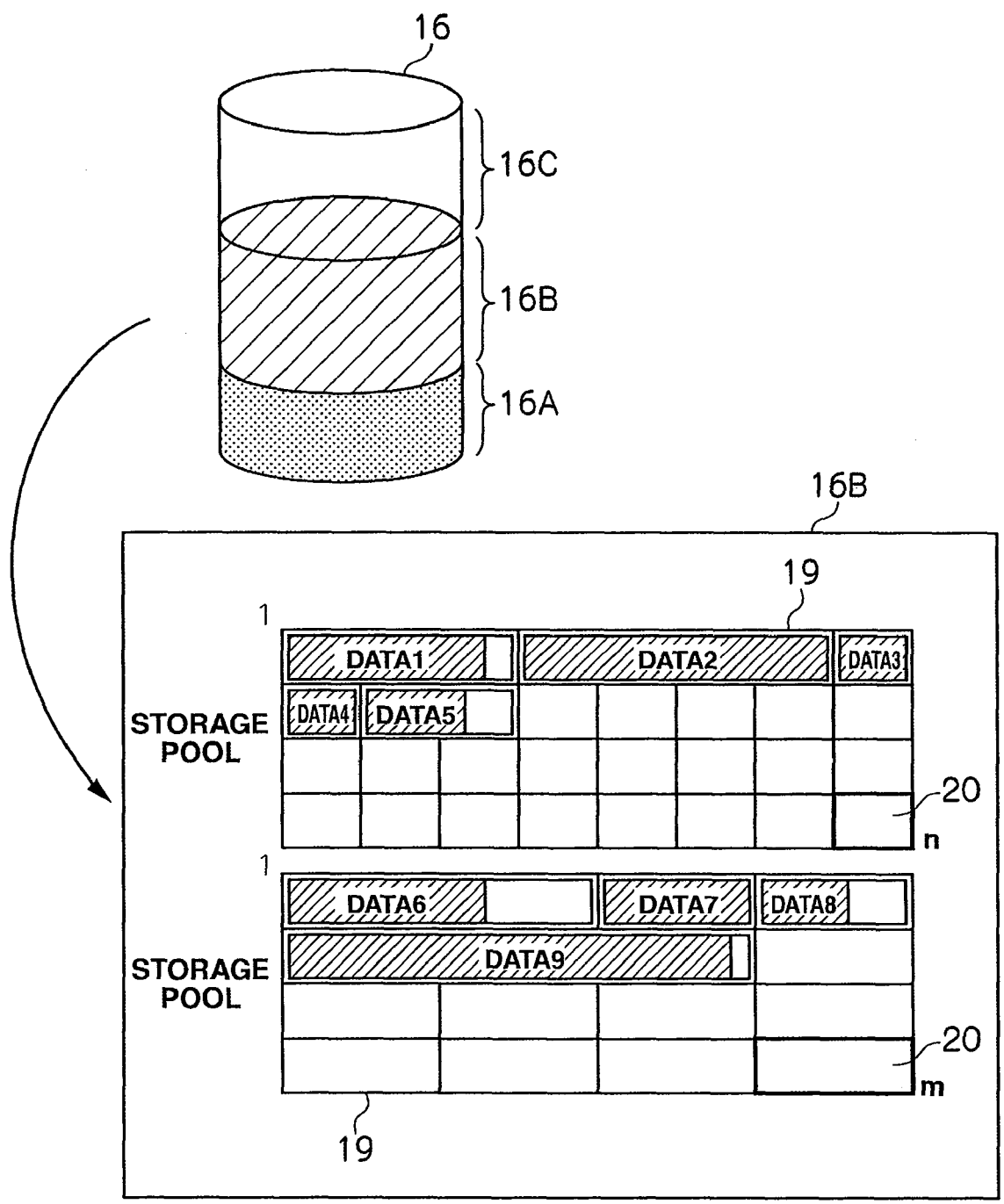
FIG. 3 is a conceptual diagram for explaining a configuration of a virtual volume.

FIG. 3 is a conceptual diagram showing a configuration of the virtual volume 16 in the storage system 1.

The virtual volume 16 is composed of a normalized volume assignment area 16A to which a normalized volume 17 is assigned, a storage pool assignment area 16B to which a storage pool 19 is assigned, and an non-assignment area 16C to which neither a normalized volume 17 or a storage pool 19 has been assigned yet.

The actual storage area in the hard disk 13, which is associated with the normalized volume 17 or the pool volume 18 in the storage pool 19, is dynamically assigned to the virtual volume 16, allowing the virtual volume 16 to be provided with the storage area.

As for the normalized volume 17, the data sent from the host apparatus 2 is stored, in the order of LBA, in the actual storage area in the hard disk 13 associated with the normalized volume 17. Note that, in the normalized volume 17, an area for LBA where a predetermined amount of data has not been stored is reserved in advance.

Regarding the storage pool 19, the data sent from the host apparatus 2 is stored in the actual storage area in the hard disk 13 associated with the pool volume 18 in the storage pool 19 in the order data was sent from the host apparatus 2, regardless of the order of LBA.

Also in the storage pool 19, the data sent from the host apparatus 2 is managed according to page size 20, which is a management unit for managing the storage area in the storage pool 19 on a predetermined-area basis. In this case, a page size value can be set for each storage pool 19.

Figure 4:
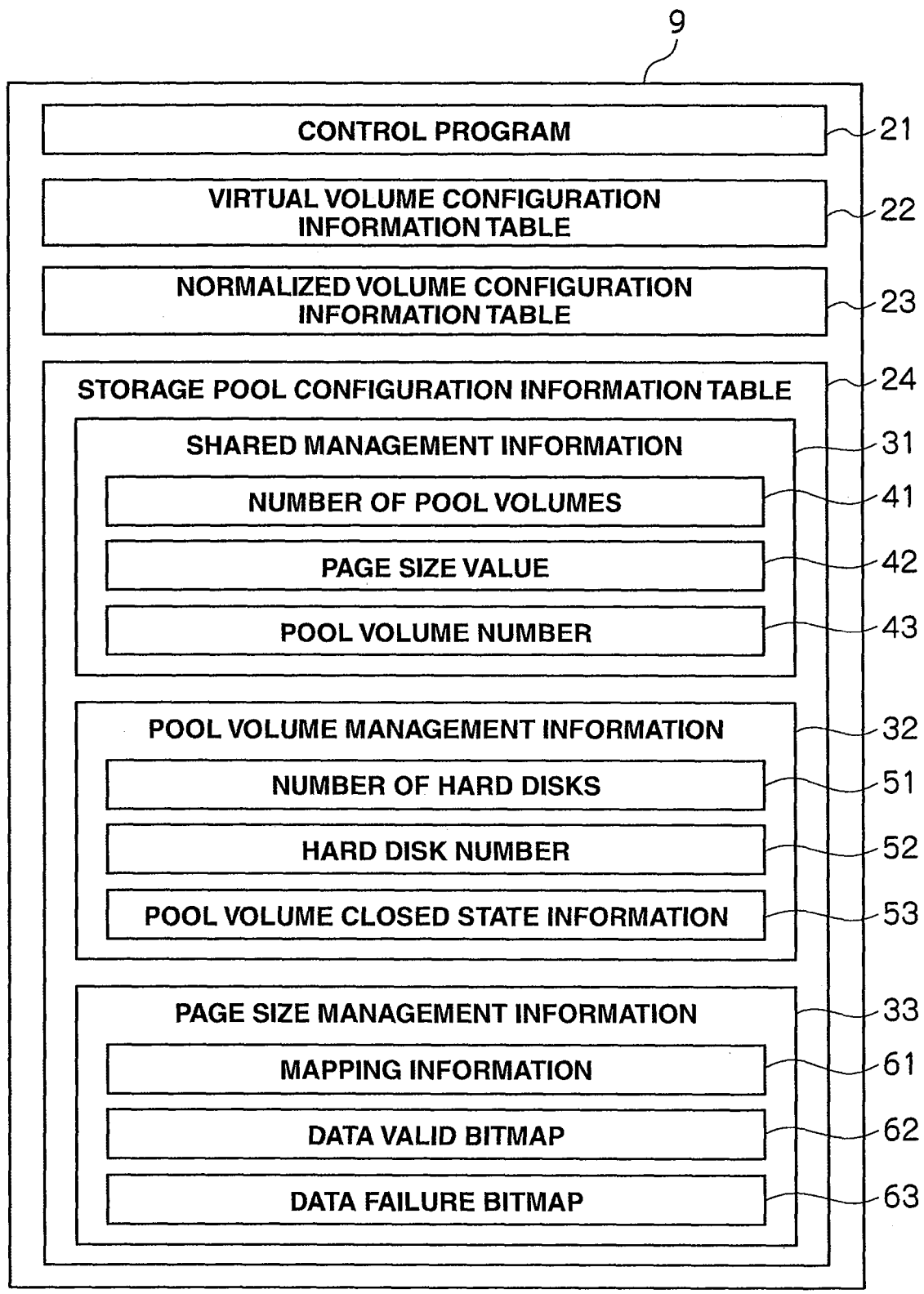
FIG. 4 is a conceptual diagram for explaining various tables stored in shared memory.

FIG. 4 shows examples of a program and various tables that are stored in the shared memory 9. The shared memory 9 is configured to include a control program 21 for controlling the entire storage apparatus 4, a virtual volume configuration information table 22 for managing configuration information on the virtual volume 16, a normalized volume configuration information table 23 for managing configuration information on the normalized volume 17, and a storage pool configuration information table 24 for managing configuration information on each storage pool 19.

The virtual volume configuration information table 22 is a table for managing information on a normalized-volume number for uniquely identifying the normalized volume 17 associated with the virtual volume 16; a storage pool number for uniquely identifying the storage pool 18 associated with the virtual volume 16; and association between the virtual volume 16 and the normalized volume 17 or the storage pool 19, information on the capacity and current assignment area of the virtual volume 16, and other configuration information.

The normalized volume configuration information table 23 is a table for managing information on a hard disk number for uniquely identifying the hard disk 13 associated with the normalized volume 17; and a storage position in the storage area where data is stored, and other configuration information.

The storage pool configuration information table 24 is configured to include shared management information 31 for managing the information concerning the entire storage pool 19, pool volume management information 32 for managing the information for each pool volume 18 associated with the storage pool 19, page size management information 33 for managing the information on the page size 20 for the storage pool 19, and other configuration information.

The shared management information 31 is configured to include a number of pool volumes 41 which is the number of pool volumes 18 associated with the storage pool 19, a page size value 42 that represents the page size set for the storage pool 19, a pool volume number 43 that is the number of the pool volume associated with the storage pool 19, and other management information.

The pool volume management information 32 is configured to include a number of hard disks 51, which is the number of hard disks 13 associated with the pool volume 18, a hard disk number 52, which is the number of the hard disk associated with the pool volume 18, pool volume closure information 53 indicating that the pool volume 18 functions or is closed, and other management information.

The page size management information 33 is configured to include mapping information 61 for managing information concerning a page size number for uniquely identifying the page size 20 and concerning, for each page size 20, the association between the virtual volume 16, the pool volume 18, and the hard disk 13, and information concerning the data storage position and concerning whether or not data is stored for each page size 20; a data valid bitmap 62 for managing information concerning whether or not the storage area for the page size 20 has been mapped in the virtual volume 16; a data failure bitmap 63 for managing information concerning whether or not there is any failure in the storage area for the page size 20, and other information.

In this case, regarding the page size management information 33, if the page size is set to be large, the system area (hereinafter refereed to as "bitmap management area") for managing the mapping information 61 and bitmaps such as the data valid bitmap 62 and the data failure bitmap 63 in the shared memory 9 can be reduced in size. On the other hand, if the page size is too large relative to the data to be stored for the page size, the unused area in the storage area in the storage pool 19 increases, which leads to reduced usage efficiency in the storage area in the storage pool 19.

Also, with the page size management information 33, if the page size is set to be small, the storage area in the storage pool 19 can be used effectively. On the other hand, if the bitmap management area in the shared memory 9 needs to be increased in size, it may result in a system area insufficiency. Also, if the number of accesses to the mapping information 61, the data valid bitmap 62, the data failure bitmap 63, etc. increases, it will lead to reduced performance in the entire storage apparatus 4 in terms of access to the host apparatus 2.

Figure 5:
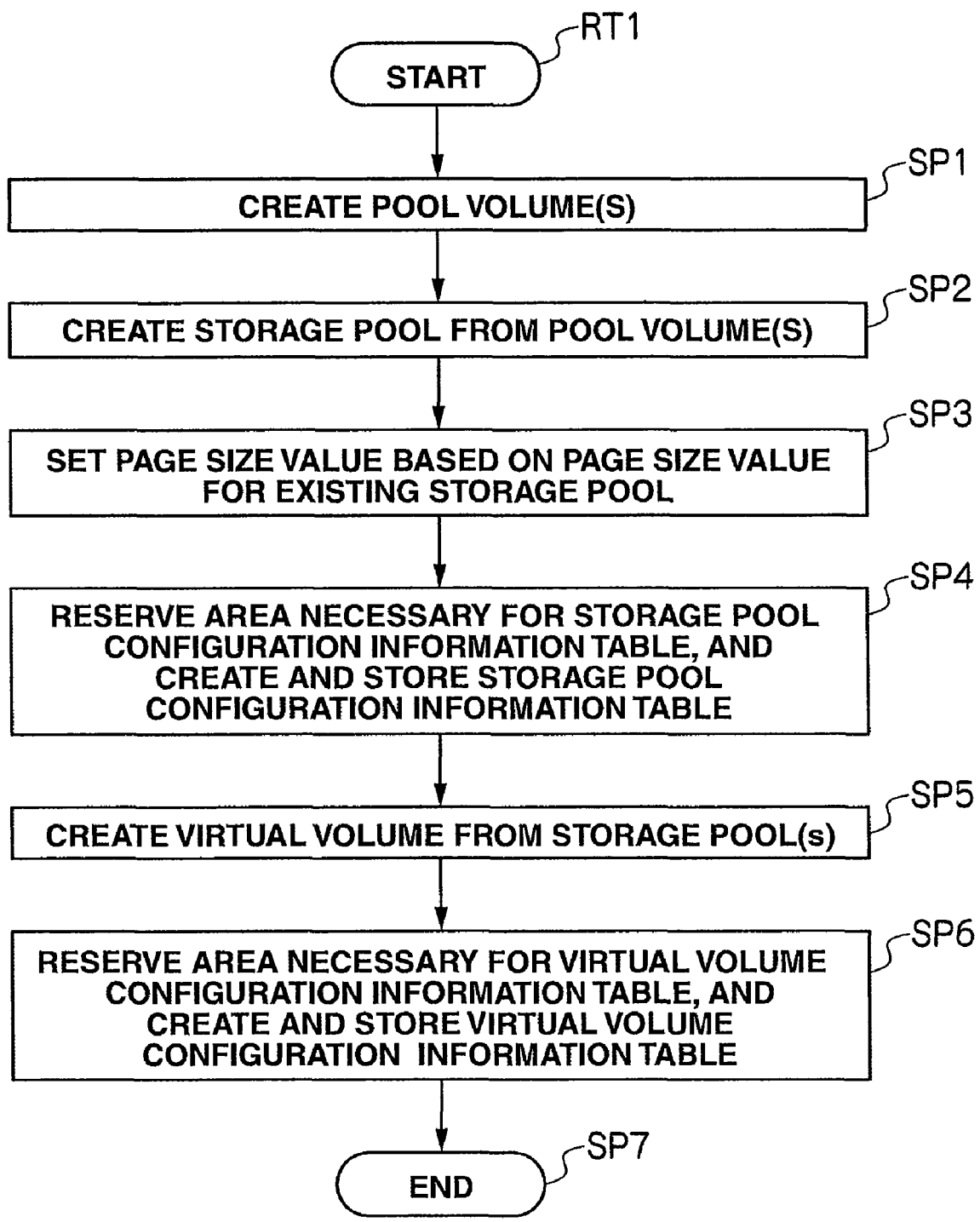
FIG. 5 is a flowchart showing a procedure for new virtual volume creation processing.

FIG. 5 shows an example of a flowchart showing a specific procedure for processing executed by the disk adapter 11 in the storage apparatus 4 regarding new virtual volume creation processing in the storage apparatus 4 in the storage system 1. Note that the normalized volume 17 will hereinafter not be mentioned.

When receiving a request, from, e.g., a service processor 12 system administrator, for specification of the information on the capacity or association of the virtual volume 16, the storage pool 19, and the pool volume 18 and other information and for creation of a new virtual volume 16, the disk adapter 11 executes, in the control program 21 for executing control processing for the disk adapter 11, a program for creating a new virtual volume 16 based on the request. Accordingly, the disk adapter 11 creates the pool volume(s) 18 that satisfy the capacity, the number of volumes and other specifications detailed in the request it has received in accordance with a procedure RT1 for new virtual volume creation processing shown in FIG. 5 (SP1).

Next, the disk adapter 11 creates, from the created pool volume(s) 18, a storage pool 19 that satisfies the capacity, the number of volumes 18 and other specification detailed in the request it has received (SP2).

Then, the disk adapter 11 refers to the page size value 42 in the shared management information 31 in the storage pool configuration management information table 24 for the existing storage pool 19, and sets the page size value for the created storage pool 19 based on the page size value for the existing storage pool 19 (SP3).

For instance, the disk adapter 11 may set, as the page size value for the created storage pool 19, the average value of the page size values 42 for all the existing storage pools 19 or the largest page size value 42 out of all the existing storage pools 19. Other various methods may also be utilized for setting the page size value for the crated storage pool 19.

Subsequently, the disk adapter 11 reserves, in the shared memory 9, an area for storing the storage pool configuration information table 24, creates the storage pool configuration information table 24 based on the set page size value for the storage pool 19, the pool volume number(s) of the associated pool volume(s), and other specifications detailed in the request, and then, stores the created storage pool configuration information table 24 in the shared memory 9 (SP4).

Next, the disk adapter 11 creates, from the created storage pool(s) 19, a virtual volume 16 that satisfies the capacity and the number of storage pools 19 and other specifications detailed in the request that it has received (SP5).

Then the disk adapter 11 reserves, in the shared memory 9, an area for storing the virtual volume configuration information table 22, creates the virtual volume configuration information table 22 based on the storage pool number(s) of the associated storage pool(s) 19 and other specifications n the request, and then stores the created virtual volume configuration information table 22 in the shared memory 9 (SP6).

After that, the disk adapter 11 terminates the procedure RT1 for new virtual volume creation processing shown in FIG. 5 (SP7).

Figure 6:
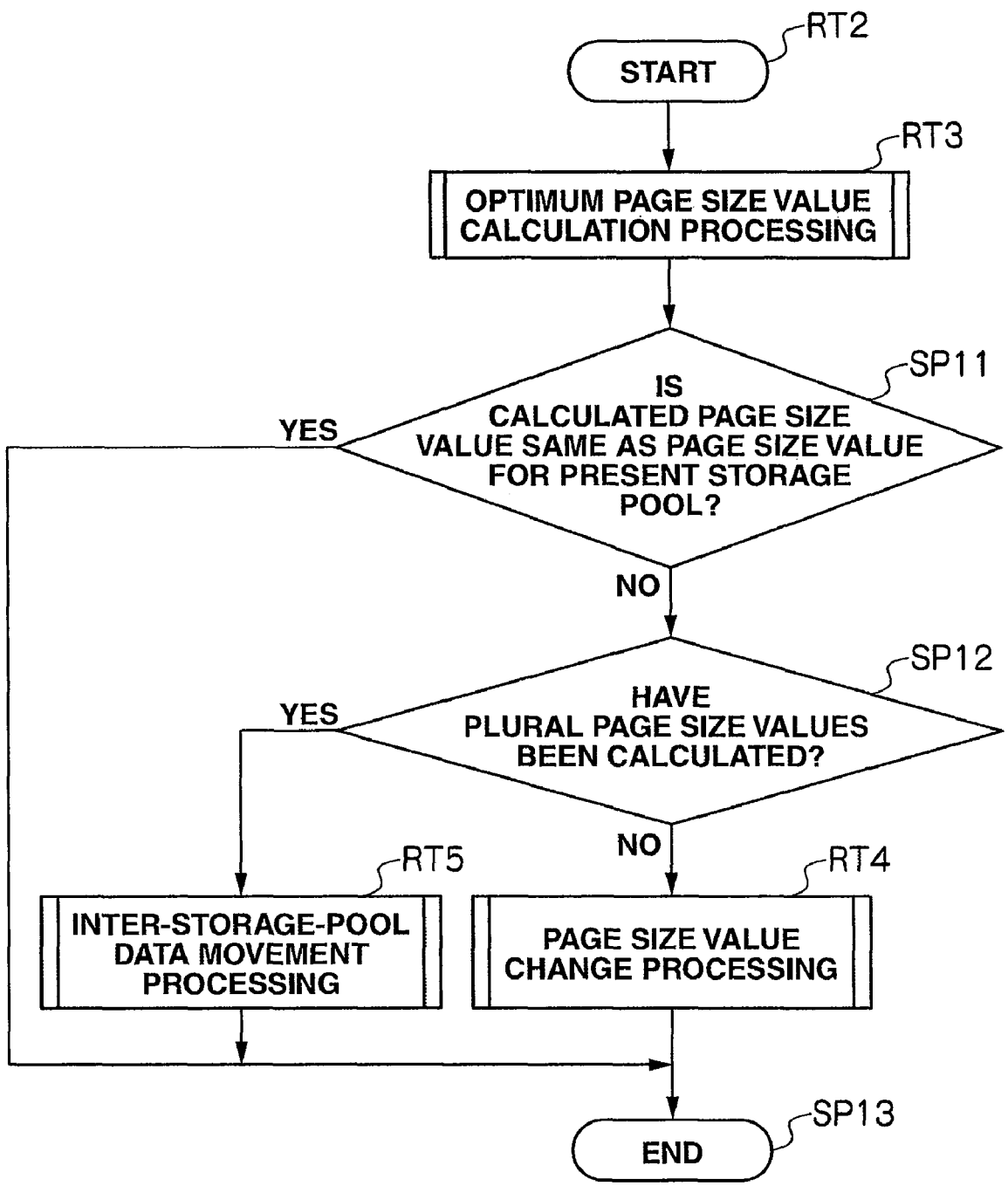
FIG. 6 is a flowchart showing a procedure for optimum page size value resetting processing.

FIG. 6 shows an example of a flowchart showing a specific procedure for processing executed by the disk adapter 11 in the storage apparatus 4 regarding optimum page size value resetting processing in the storage apparatus 4 in the storage system 1.

For each lapse of a predetermined period, e.g., a day, or when receiving a request, from, e.g., an administrator of the service processor 12, for specification of the storage pool 19 and resetting for an optimum page size value, the disk adapter 11 executes, in the control program 21, a program for resetting an optimum page size value for the targeted storage pool 19 via analysis of the status of access from the host apparatus 2. Accordingly, the disk adapter 11 executes optimum page size value calculation processing for the targeted storage pool 19 via the analysis of the status of access from the host apparatus 2 in accordance with a procedure RT2 for optimum page size value resetting processing shown in FIG. 6 (RT3) (This will be described later.).

Subsequently, the disk adapter 11 checks whether or not the page size value calculated by the optimum page size value calculation processing is the same as the page size value 42 for the targeted storage pool 19 (SP11).

Then, if the page size value calculated by the optimum page size value calculation processing is the same as the page size value 42 for the targeted storage pool 19 (SP11: YES), the disk adapter 11 does not reset the page size value 42 for the targeted storage pool 19, and terminates the procedure RT 2 for optimum page size value resetting processing shown in FIG. 6 (SP13).

On the other hand, if the page size value calculated by the optimum page size value calculation processing is not the same as the page size value 42 for the targeted storage pool 19, i.e., if the page size value calculated by the optimum page size value calculation processing differs from the page size value 42 for the targeted storage pool 19 (SP11: NO), the disk adapter 11 checks whether or not plural page size values have been calculated by the optimum page size value calculation processing (SP12).

Then, if plural page size values have not been calculated by the optimum page size value calculation processing, i.e., where one page size value has been calculated by the optimum page size value calculation processing (SP12: NO), the disk adapter 11 executes optimum page size value change processing for changing the page size value calculated by the optimum page size value calculation processing (RT4) (This will be described later.). Then, the disk adapter 11 terminates the procedure RT2 for optimum page size value resetting processing shown in FIG. 6 (RT13).

On the other hand, if plural page size values have been calculated by the optimum page size value calculation processing (SP12: YES), the disk adapter 11 executes inter-storage-pool data movement processing for moving data to the storage pool 19 with the page size value calculated by the optimum page size value calculation processing (RT5) (This will be described later.), and then terminates the procedure RT2 for optimum page size value resetting processing shown in FIG. 6 (SP13).

Figure 7:
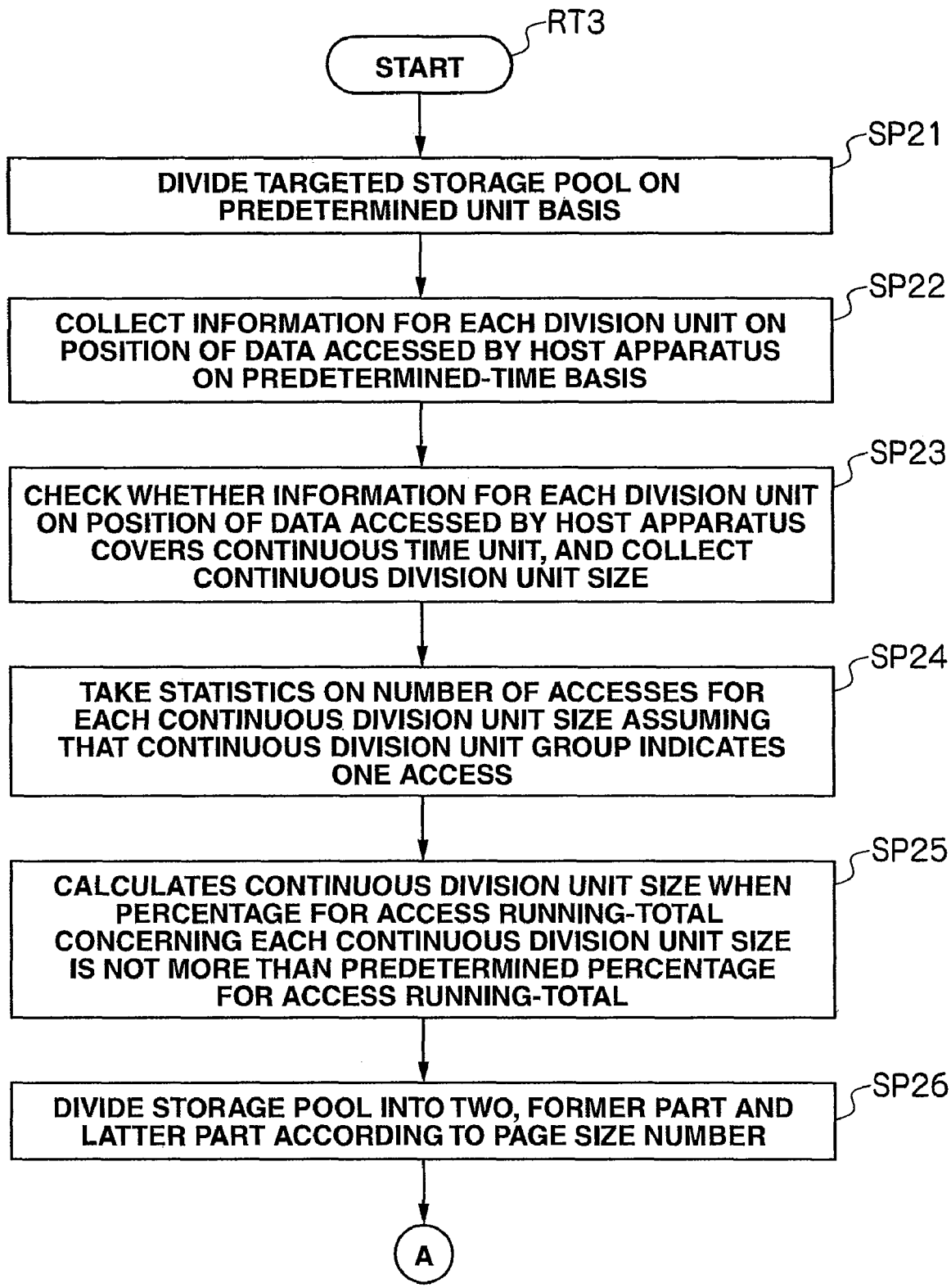
FIG. 7 is a flowchart showing a procedure for optimum page size value calculation processing.
Figure 8:
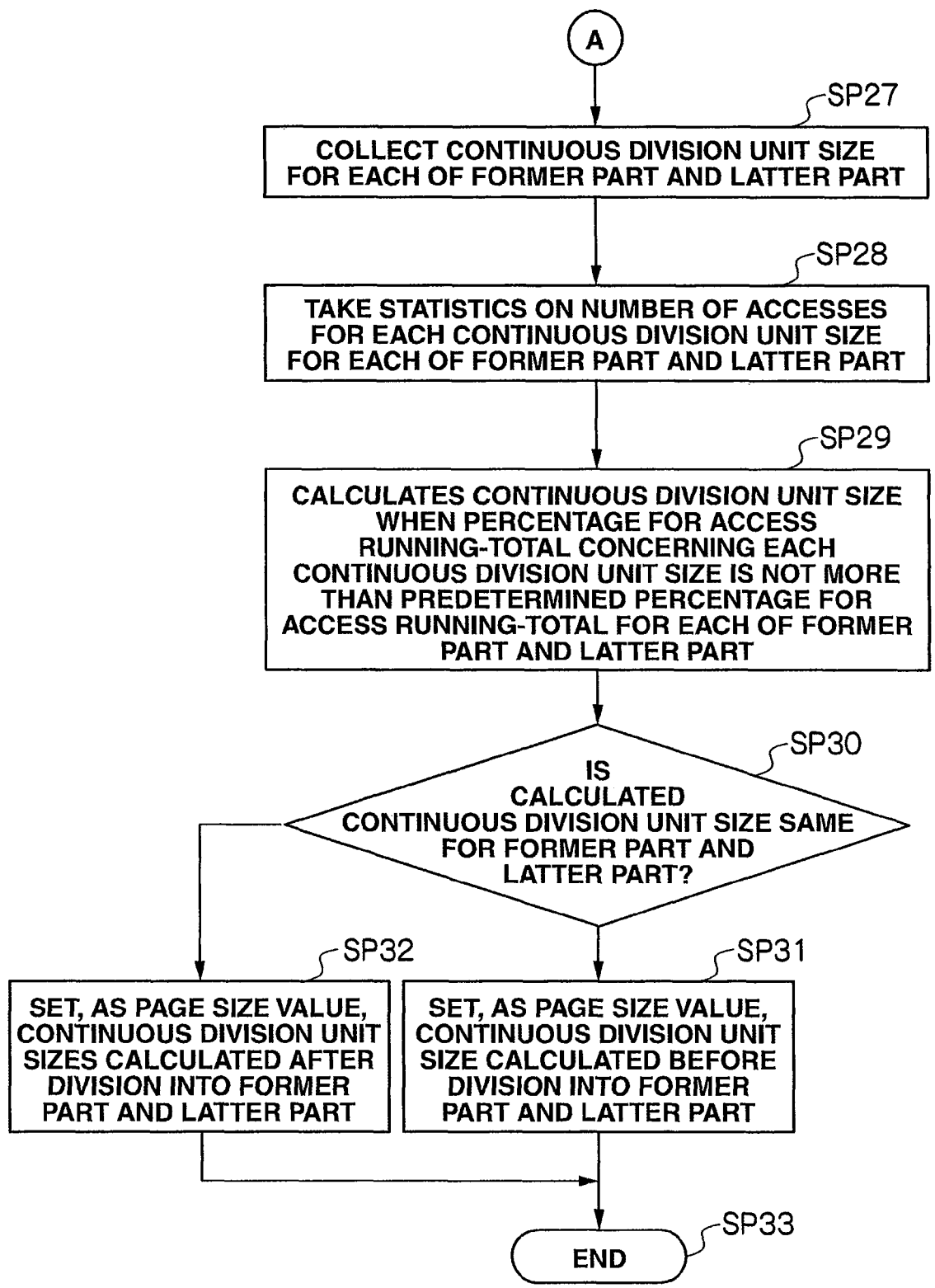
FIG. 8 is a flowchart showing a procedure for optimum page size value calculation processing.

FIGS. 7 and 8 show an example of a flowchart for a specific procedure for processing executed by the disk adapter 11 in the storage apparatus 4 regarding the optimum page size value calculation processing in the storage apparatus 4 in the storage system 1.

Upon starting the optimum page size value resetting processing (RT2), the disk adapter 11 executes, in the control program 21, a program for calculating an optimum page size value for the targeted storage pool 19. Accordingly, the disk adapter 11 divides the page size value 42 (management unit) for the targeted storage pool 19 on a predetermined-unit basis in accordance with the procedure RT3 for optimum page size value calculation processing shown in FIGS. 7 and 8 (SP21).

The disk adapter 11 divides the page size value 42 for the targeted storage pool 19 into quarters, for example. Note that, the disk adapter 11 can divide the minimum page size value 42 of the page size values 42 for all the existing storage pools 19 into quarters, and can conduct other types of division in various units. A predetermined divided unit will hereinafter be referred to as a division unit "s".

Subsequently, the disk adapter 11 collects the information, for each division unit "s", on the position of the data accessed by the host apparatus 2 on a predetermined-time basis (SP22). Note that this collection may be performed more than once. A predetermined time unit will hereinafter be referred to as a time unit "t".

Figure 9:
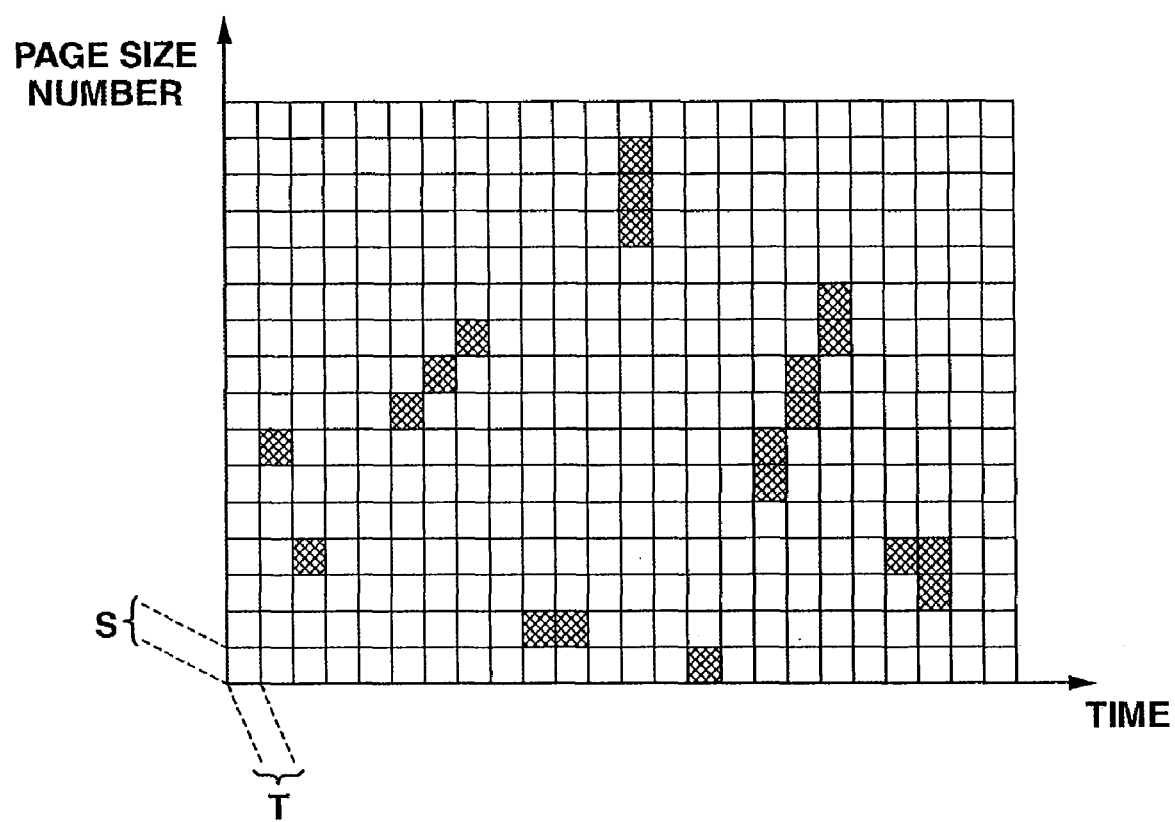
FIG. 9 is a conceptual diagram in which the result of time-unit based collection of information for each division unit on the position of the data accessed by a host apparatus is shown in chart form.

FIG. 9 shows an example of a conceptual diagram in which the result of the collection of the information, for each division unit "s", on the position of the data accessed by the host apparatus 2 on the time unit "t" basis is shown in chart form. In the diagram, the horizontal axis indicates the passage of time, while the vertical axis indicates the order of page size numbers. The disk adapter 11 collects the information on the position of the data accessed by the host apparatus 2.

Next, the disk adapter 11 checks whether or not the information for each division unit "s" on the position of the data accessed by the host apparatus 2 cover continuous time units "t" and collects the continuous division unit size.

Figure 10:
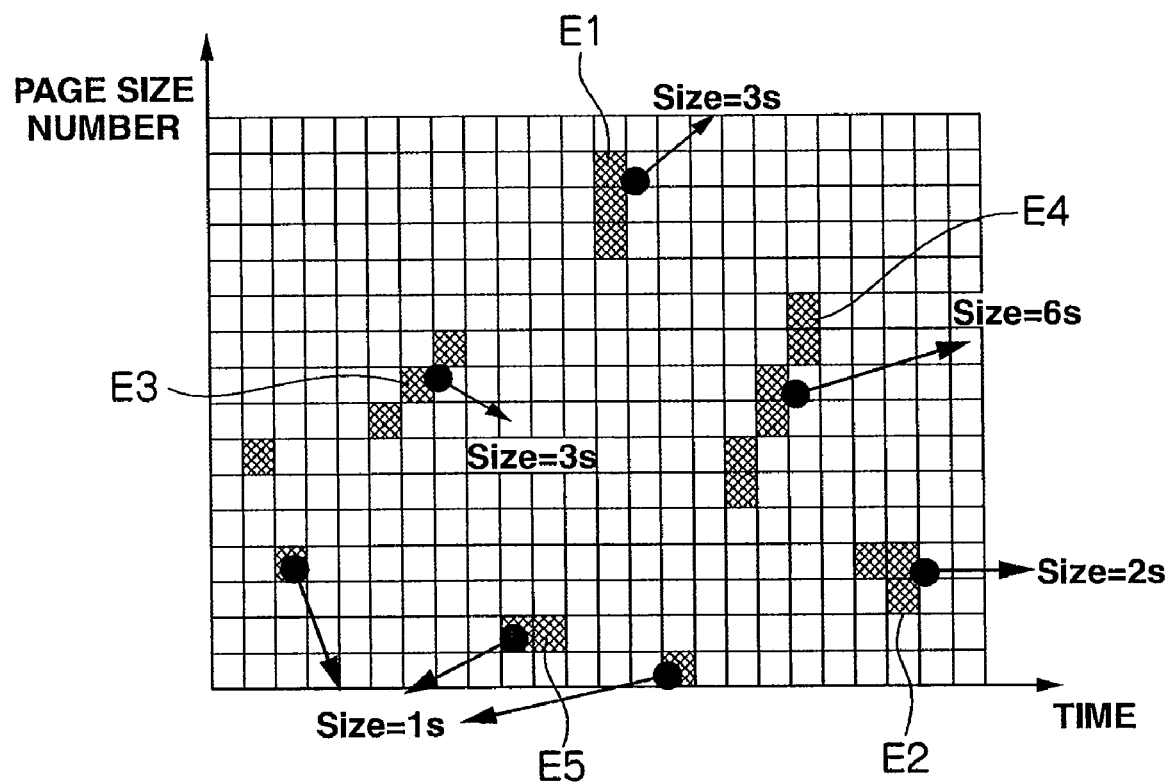
FIG. 10 is a conceptual diagram illustrating the result of the collection of each continuous division unit size.

FIG. 10 shows an example of a conceptual diagram illustrating the result of the collection of each continuous division unit size based on the conceptual diagram of FIG. 9.

For instance, when the division units "s" indicating the position of the data accessed by the host apparatus 2 are continuous in the same time unit "t", the disk adapter 11 recognizes the division units "s" compose continuous division units (E1, E2).

Here, regarding the continuous division units E1, the host apparatus 2 accesses the data that covers the same time unit "t" and three continuous division units "s". Therefore, the disk adapter 11 recognizes the continuous division unit size as "3". That continuous division unit size is referred to as "3S".

Also, regarding the continuous division units E2, the host apparatus 2 accesses the data that covers two continuous division units "s" in the same time unit "t". Therefore, the disk adapter 11 recognizes the continuous division unit size as "2s".

In addition, for example, when the division units "s" indicating the position of the data accessed by the host apparatus 2 are continuous in continuous time units "t", the disk adapter 11 recognizes the division units "s" compose continuous division units (E3, E4).

Here, regarding the continuous division units E3, the host apparatus 2 accesses the data that covers three continuous time units "t" and three continuous division units "s". Therefore, the disk adapter 11 recognizes the continuous division unit size as "3s".

Also, regarding the continuous division units E4, the host apparatus 2 accesses the data that covers two continuous division units "s" in the same time unit "t", and also accesses the data that covers three continuous division units "s" in three continuous time units "t". Therefore, the disk adapter 11 recognizes the continuous division unit size as "6s".

Note that, regarding continuous division units E5, the host apparatus 2 accesses the data that covers the same division unit "s" in two continuous time units "t". Therefore, the disk adapter 11 does not recognize the division unit "s" as continuous division units, and recognizes two division units each having a size of "1s".

Subsequently, the disk adapter 11 takes statistics on the number of accesses for each continuous division unit size assuming that a continuous division unit group indicates one access. (SP24).

Figure 11:
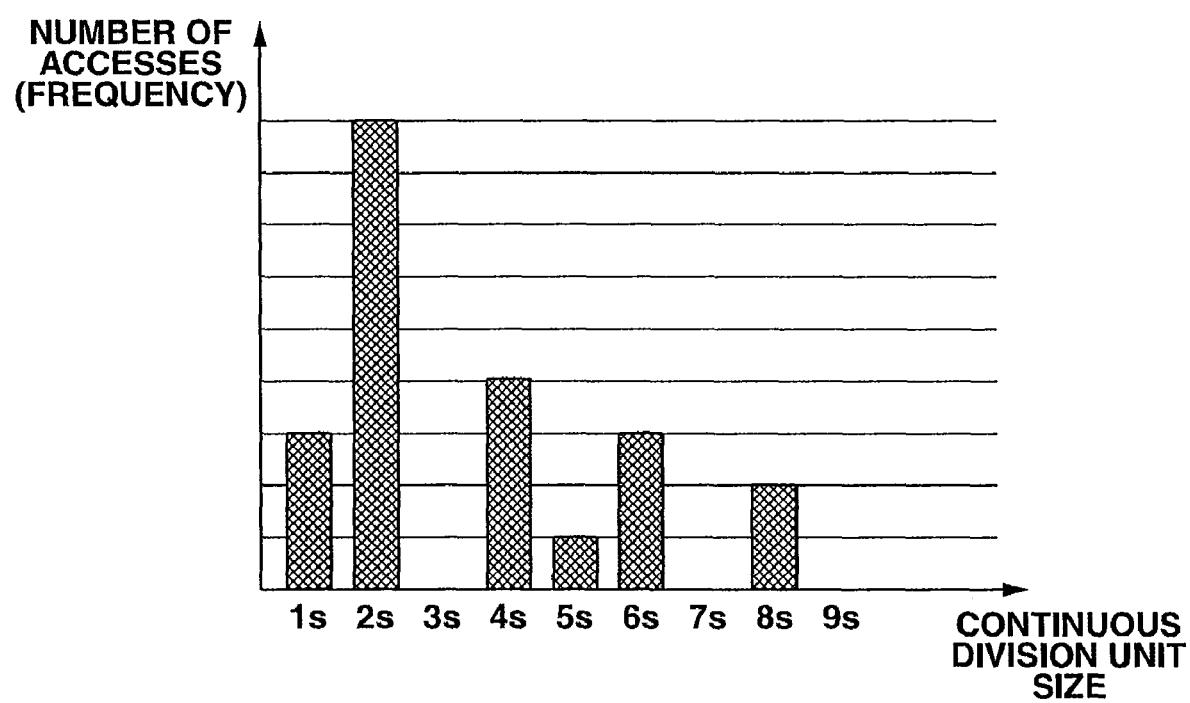
FIG. 11 is a conceptual diagram in which the statistical result on the number of accesses for each continuous division unit size is shown in chart form.

FIG. 11 shows an example of a conceptual diagram in which the statistical result on the number of accesses for each continuous division unit size is shown in chart form. In the diagram, the horizontal axis indicates the continuous division unit size, while the vertical axis indicates the number of accesses. As described above, the disk adapter 11 takes statistics on the number of accesses for each continuous division unit size.

Here, the number of accesses for the continuous division unit size "1s" is "3"; the number of accesses for the continuous division unit size "2s" is "9"; the number of accesses for the continuous division unit size "4s" is "4"; the number of accesses for the continuous division unit size "5s" is "1"; the number of accesses for the continuous division unit size "6s" is "3"; and the number of accesses for the continuous division unit size "8s" is "2". The total number of accesses is "22".

Next, the disk adapter 11 calculates the continuous division unit size when the percentage of the access running-total, which is obtained by adding the number of accesses in order of size from the continuous division unit size, "1s", in the total number of accesses is not more than a predetermined percentage for the access running-total (SP25).

Figure 12:
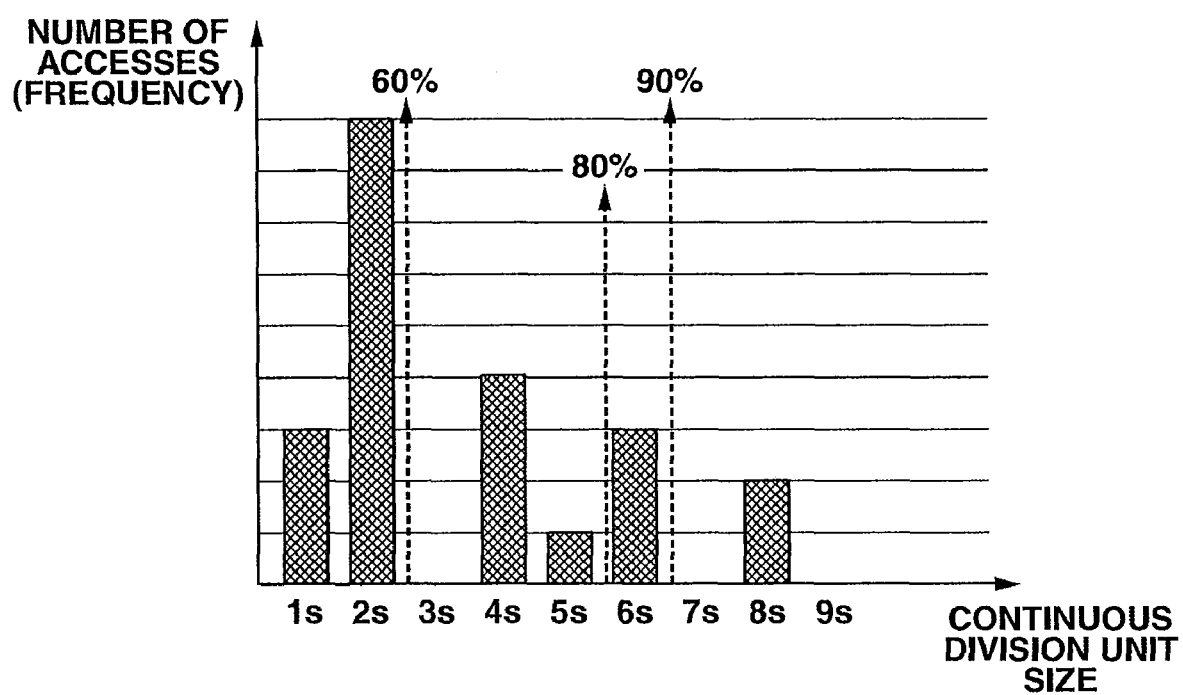
FIG. 12 is a conceptual diagram illustrating the percentage of the access running-total in the total number of accesses.

FIG. 12 shows an example of a conceptual diagram in which the percentage of the access running-total in the total number of accesses is expressed in the conceptual diagram of FIG. 11.

In the diagram, the continuous division unit size when the percentage for the access running-total concerning each continuous division unit size is not more than "60%" is "2s"; the continuous division unit size when the percentage is not more than "80%" is "5s"; and the continuous division unit size when the percentage is not more than "90%" is "6s".

For example, if the predetermined percentage of the access running-total in the total number of accesses is "80%", the disk adapter 11 calculates "5s" as the continuous division unit size with which the percentage for the access running-total is not more than the predetermined percentage for the access running-total.

Next, the disk adapter 11 divides the storage pool 19 into two, a former part and a latter part according to the page size number (SP26).

Figure 13:
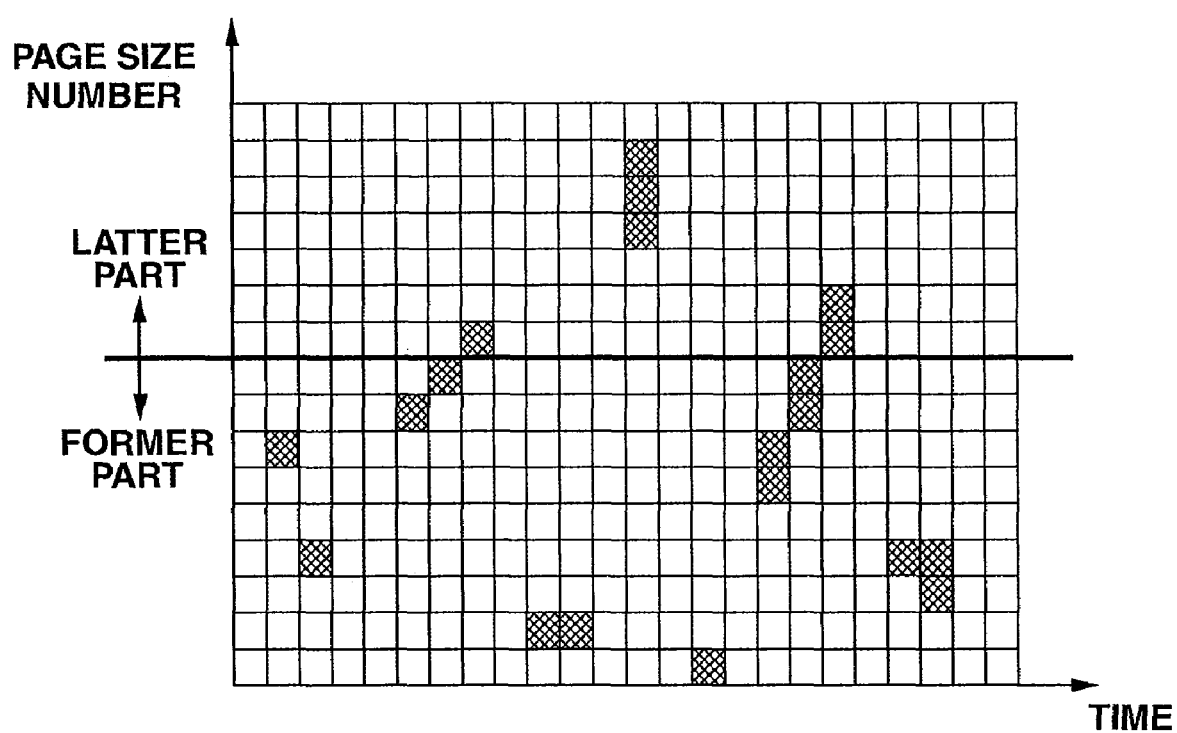
FIG. 13 is a conceptual diagram in which a storage pool is divided into two, the former part and the latter part according to a page size number.

FIG. 13 shows an example of a conceptual diagram in which the storage pool 19 is divided into two, a former part and a latter part according to the page size number in the conceptual diagram of FIG. 9. The disk adapter 11 divides the storage pool 19 into two, a former part and a latter part each of which is for half of all page size numbers.

Subsequently, the disk adapter 11 collects each continuous division unit size for each of the former part and the latter part like in the above step SP23 (SP27). Then, the disk adapter 11 takes statistics on the number of accesses for each continuous division unit size for each of the former part and the latter part like in the above step SP24 (SP28).

FIG. 14 shows an example of a conceptual diagram in which the statistical result on the number of accesses for each continuous division unit size is shown in chart form for each of the former part and the latter part like in FIG. 11 described above.

Next, the disk adapter 11 calculates the continuous division unit size when the percentage of the access running-total in the total number of accesses is not more than the predetermined percentage for the access running-total, like in the above-described step SP25 for each of the former part and the latter part (SP29).

Then the disk adapter 11 checks whether or not the calculated continuous division unit size is the same for the former part and the latter part (SP30). Then, if the calculated continuous division unit size is the same (SP30: YES), the disk adapter 11 sets, as the calculated page size value, the continuous division unit size calculated before the division into the former part and the latter part (SP31).

For instance, the disk adapter 11 sets, as the calculated page size value, the continuous division unit size "5s" calculated before the division into the former part and the latter part.

On the other hand, if the calculated continuous division unit size is not the same for the former part and the latter part, i.e., if the calculated continuous division unit size is different for the former part and the latter part (SP30: NO), the disk adapter 11 sets, as the calculated page size values, the calculated continuous division unit sizes for the divided former part and latter part (SP32).

For example, if the continuous division unit size calculated for the former part is "4s" and the calculated continuous division unit size for the latter part is "2s", the disk adapter 11 sets, as the calculated page size values "4s" (for the former part) and "2s" (for the latter part), which indicate the calculated continuous division unit sizes.

After that, the disk adapter 11 terminates the procedure RT3 for optimum page size value calculation processing shown in FIGS. 7 and 8 (SP33).

Note that, this embodiment has been described for the case where the storage pool 19 is divided into the former and latter part according to the page size number. However, this invention is not limited to the above case. The storage pool 19 may be divided into four parts according to the page size number. Alternatively, a procedure may be adopted where: the continuous division unit sizes are calculated for the two divided parts, a former part and a latter part; and then, the storage pool 19 is divided into four parts according to the page size number to calculate the continuous division unit sizes for the four parts and set the sizes as the page size values. Other various methods can also be adopted for the calculation of optimum page size values.

Figure 15:
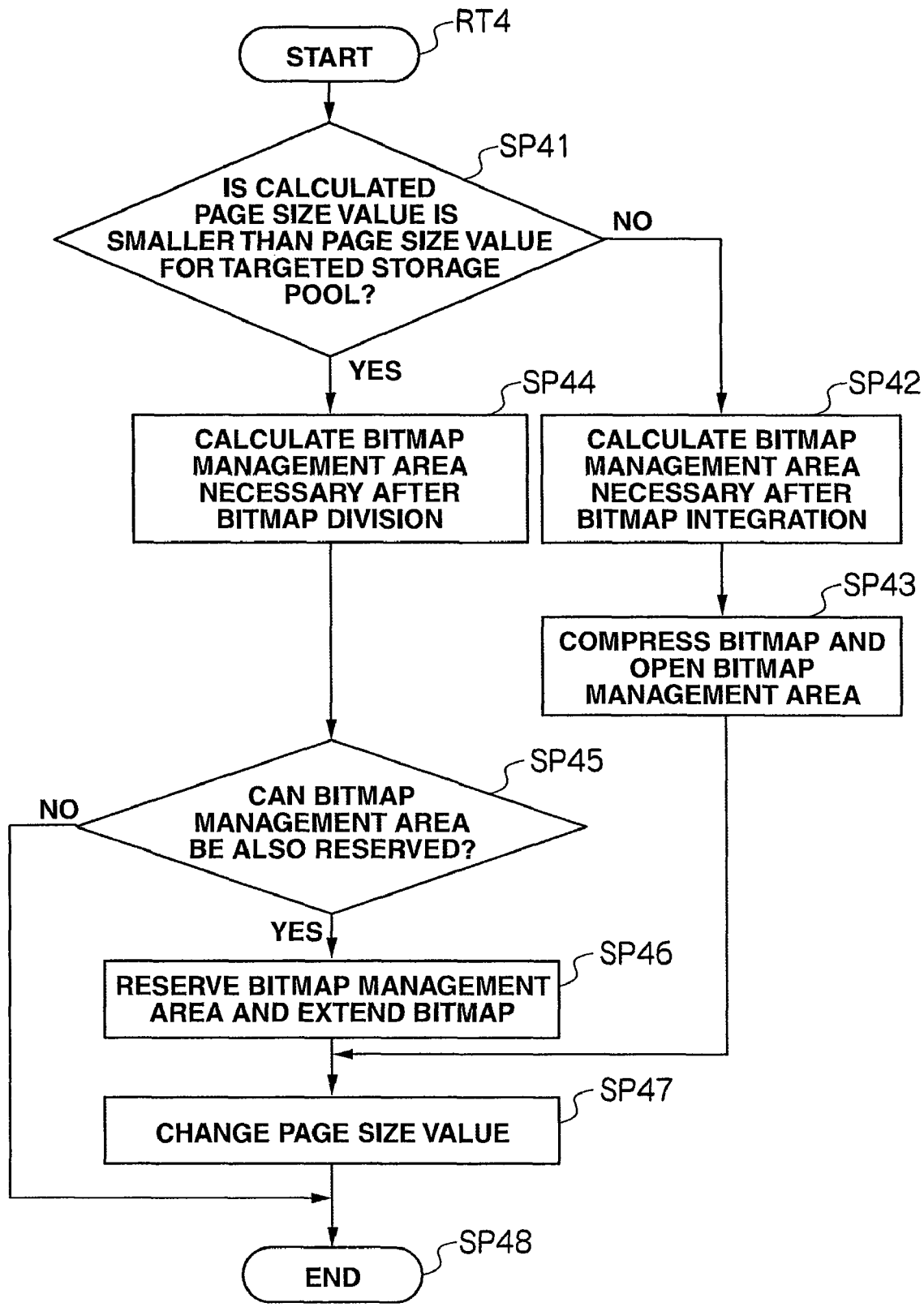
FIG. 15 is a flowchart showing a procedure for page size value change processing.

FIG. 15 shows an example of a flowchart showing a specific procedure for processing executed by the disk adapter 11 in the storage apparatus 4 regarding the page size value change processing in the storage apparatus 4 in the storage system 1.

If one page size value is calculated by the optimum page size value calculation processing (SP12: NO), the disk adapter 11 executes, in the control program 21, a program for changing the page size value 42 for the targeted storage pool 19 to the page size value calculated by the optimum page size value calculation processing. Accordingly, the disk adapter 11 checks, whether or not the calculated page size value is smaller than the page size value 42 for the targeted storage pool 19, in accordance with the procedure RT4 for page size value change processing shown in FIG. 15 (SP41).

Then, if the calculated page size value is not smaller than the page size value 42 for the targeted storage pool 19, i.e., if the calculated page size value is equal to or larger than the page size value 42 for the targeted storage pool 19 (SP41: NO), the disk adapter 11 can increase the page size value 42 for the targeted storage pool 19 and decrease the bitmap management area in the shared memory 9. Then, the disk adapter 11 calculates the bitmap management area necessary after integration of the mapping information 61 and the bitmaps such as the data valid bitmap 62 and the data failure bitmap 63 (SP42).

Subsequently, the disk adapter 11compresses the mapping information 61 and the bitmaps such as the data valid bitmap 62 and the data failure bitmap 63 for the targeted storage pool 19, and (partially) opens the bitmap management area that has become free as a result of the bitmap compression (SP43), and then proceeds to step SP47.

On the other hand, if the calculated page size value is smaller than the page size value 42 for the targeted storage pool 19 (SP41: YES), the disk adapter 11 needs to decrease the page size value 42 for the targeted storage pool 19 and increase the bitmap management area in the shared memory 9. Therefore, the disk adapter 11 calculates a bitmap management area necessary after the division of the mapping information 61 and the bitmaps such as the data valid bitmap 62 and the data failure bitmap 63 (SP44).

Then, the disk adapter 11 checks whether or not it can also reserve the calculated bitmap management area necessary after the division of the mapping information 61, the bitmaps such as the data valid bitmap 62 and the data failure bitmap 63 (SP45).

If the disk adapter 11 cannot reserve the necessary bitmap management area (SP45: NO), the disk adapter 11 does not change the page size value 42 for the targeted storage pool 19, and terminates the procedure RT4 for page size value change processing shown in FIG. 15 (SP48).

On the other hand, if the disk adapter 11 can reserve the necessary bitmap management area (SP45: YES), the disk adapter 11 reserves the bitmap management area, and expands the mapping information 61 and the bitmaps such as the data valid bitmap 62 and the data failure bitmap 63 (SP46).

Then the disk adapter 11 changes the page size value 42 for the targeted storage pool 19 to the calculated page size value (SP47), and then terminates the procedure RT4 for page size value change processing shown in FIG. 15 (SP48).

Figure 16:
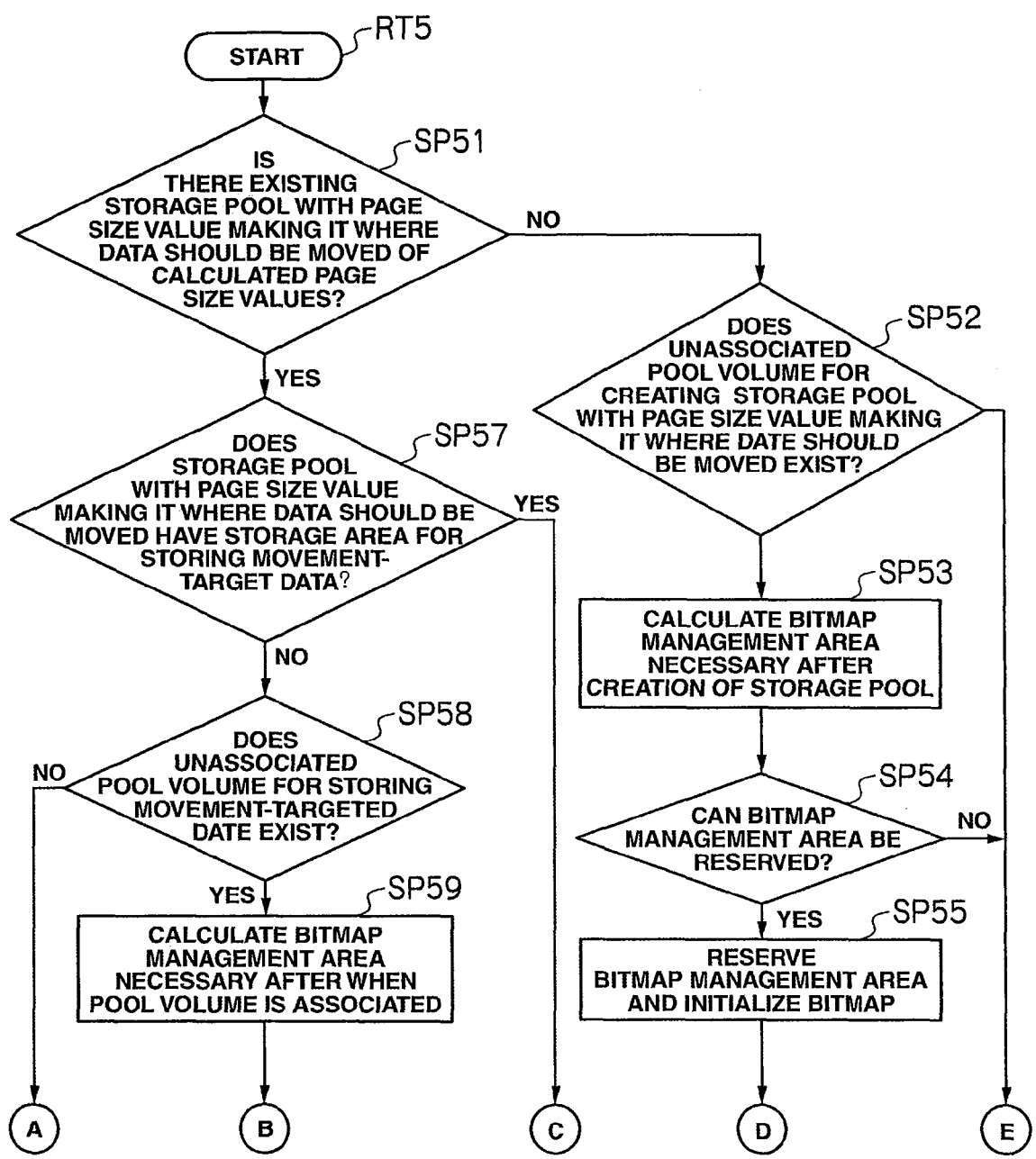
FIG. 16 is a flowchart showing a procedure for inter-storage-pool data movement processing.
Figure 17:
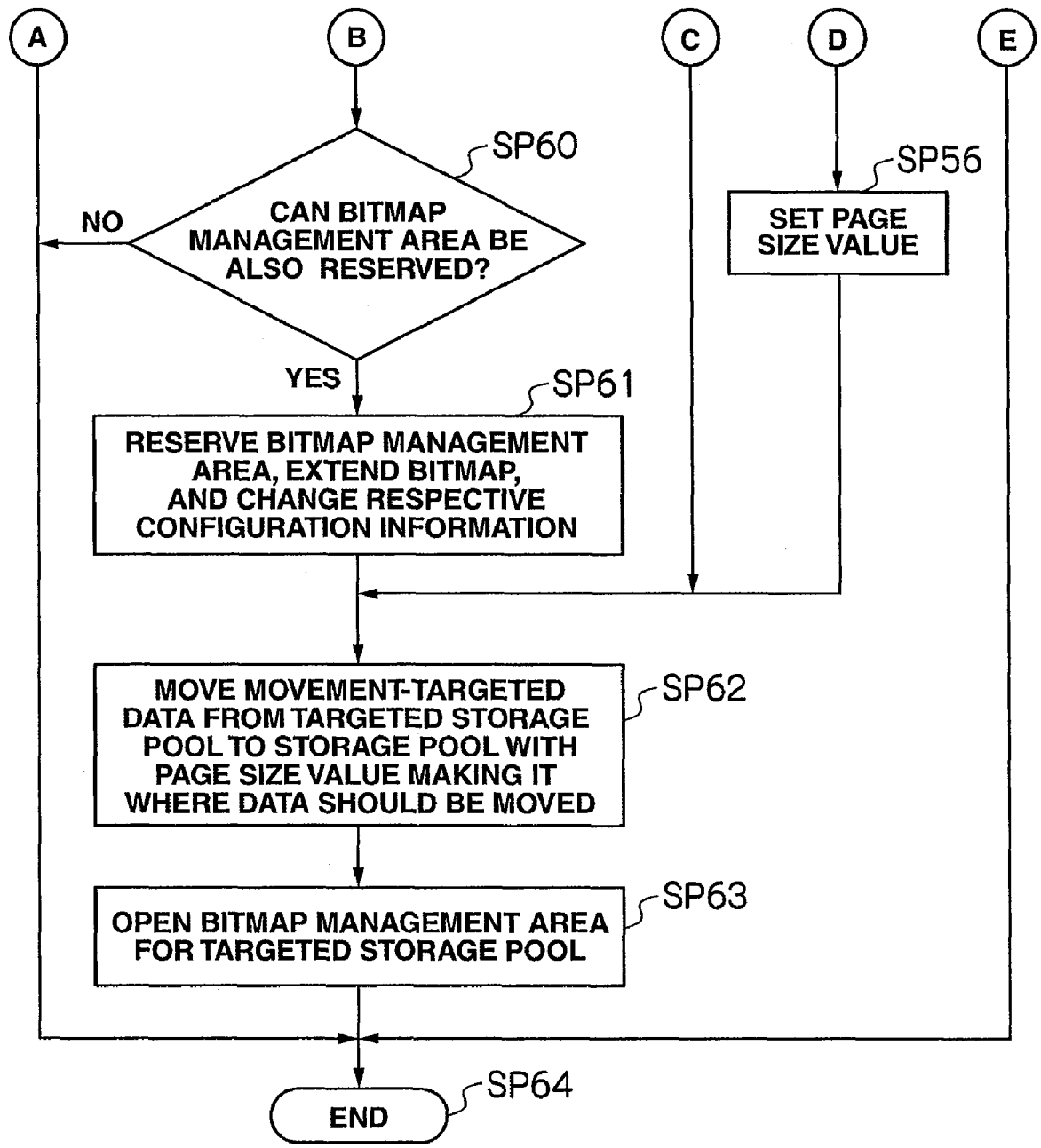
FIG. 17 is a flowchart showing a procedure for inter-storage-pool data movement processing.

FIGS. 16 and 17 show an example of a flowchart showing a specific procedure for processing executed by the disk adapter 11 in the storage apparatus 4 regarding inter-storage-pool data movement processing in the storage apparatus 4 in the storage system 1.

If plural page size values are calculated in the optimum page size value calculation processing (SP12: YES), the disk adapter 11 executes, in the control program 21, an inter-storage-pool data movement program for moving data to the storage pool 19 with the page size value calculated by the optimum page size value calculation processing. Accordingly, the disk adapter 11 checks, whether or not there is an existing storage pool 19 with a page size value making it where data should be moved, in accordance with the procedure RT5 for inter-storage-pool data movement processing shown in FIGS. 16 and 17 (SP51).

Incidentally, the page size value making the storage pool 19 where data should be moved, of the plural calculated page size values, is the page size value not equal to the page size value 42 for the targeted storage pool 19.

Then, if there is no existing storage pool 19 with a page size value making it where data should be moved (SP51: NO), the disk adapter 11 checks whether or not there is an unassociated pool volume 18 for creating the storage pool 19 with a page size value making it where data should be moved (SP52). If there is no unassociated pool volume 18 for creating the storage pool 19 with a page size value making it where data should be moved (SP52: NO), the disk adapter 11 does not perform data movement, does not change the page size value 42 for the targeted storage pool 19, and terminates the procedure RT5 for inter-storage-pool data movement processing shown in FIGS. 16 and 17 (SP64).

On the other hand, if there is an unassociated pool volume 18 for creating the storage pool 19 with a page size value making it where data should be moved (SP52: YES), the disk adapter 11 needs to create the storage pool 19 and reserve the bitmap management area in the shared memory 9. Therefore, the disk adapter 11 calculates the bitmap management area necessary after the creation of the storage pool 19 (SP53).

Next, the disk adapter 11 checks whether or not it can reserve the bitmap management area necessary after the creation of the storage pool 19 (SP54). If the disk adapter 11 cannot reserve the necessary bitmap management area (SP54: NO), the disk adapter 11 does not perform data movement, does not change the page size value 42 for the targeted storage pool 19, and terminates the procedure RT5 for inter-storage-pool data movement processing shown in FIGS. 16 and 17 (SP64).

On the other hand, if the disk adapter 11 can reserve the necessary bitmap management area (SP54: YES), the disk adapter 11 reserves the bitmap management area after the creation of the storage pool 19, and initializes the mapping information 61 and the bitmaps such as the data valid bitmap 62 and the data failure bitmap 63 (SP55).

Then, the disk adapter 11 sets the page size value 42 for the created storage pool 19 to the page size value making the storage pool 19 where data should be moved, of the calculated page size values (SP56) and then proceeds to step SP62.

On the other hand, if there is an existing storage pool 19 with a page size value making it where data should be moved (SP51: YES), the disk adapter 11 checks whether or not the storage pool 19 with a page size value making it where data should be moved has a storage area for storing movement-targeted data (SP57). Then, if the existing storage pool 19 with a page size value making it where data should be moved has a storage area for storing movement-targeted data (SP57: YES), the disk adapter 11 proceeds to step SP62.

On the other hand, if the storage pool 19 with a page size value making it where data should be moved does not have a storage area for storing movement-targeted data (SP57: NO), the disk adapter 11 checks whether or not there is an unassociated pool volume 18 (storage area) for storing the movement-targeted data (SP58). Then, if there is no unassociated pool volume 18 for storing the movement-targeted data (SP58: NO), the disk adapter 11 does not perform data movement, does not change the page size value 42 for the targeted storage pool 19, and terminates the procedure RT5 for inter-storage-pool data movement processing shown in FIGS. 16 and 17 (SP64).

On the other hand, if there is an unassociated pool volume 18 for storing the movement-targeted data (SP58: YES), the disk adapter 11 needs to associate the pool volume 18 with the storage pool 19 with a page size value making it where data should be moved and also reserve a bitmap management area in the shared memory 9. Therefore, the disk adapter 11 calculates the bitmap management area necessary after the pool volume 18 is associated with the storage pool 19 with a page size value making it where data should be moved (SP59).

Subsequently, the disk adapter 11 checks whether or not it can reserve the bitmap management area necessary after the pool volume 18 is associated with the storage pool 19 with a page size value making it where data should be moved (SP60). If the disk adapter 11 cannot reserve the necessary bitmap management area (SP60: NO), the disk adapter 11 does not perform data movement, does not change the page size value 42 for the targeted storage pool 19, and terminates the procedure RT5 for inter-storage-pool data movement processing shown in FIGS. 16 and 17 (SP64).

On the other hand, if the disk adapter 11 can reserve the necessary bitmap management area (SP60: YES), the disk adapter 11 reserves the bitmap management area; expands the area for the mapping information 61 and the bitmaps such as the data valid bitmap 62 and the data failure bitmap 63; and changes configuration information in each of the virtual volume configuration information table 22, the storage pool configuration information table 24, etc. in order to change information on the association between the virtual volume 16 and the storage pool 19 and other information (SP61).

Then, the disk adapter 11 moves the movement-targeted data from the targeted (source) storage pool 19 to the storage pool 19 with a page size value making it where data should be moved (SP62).

Subsequently, the disk adapter 11 compresses the mapping information 61 and the bitmaps such as the data valid bitmap 62 and the data failure bitmap 63 for the targeted storage pool 19 along with the movement of the movement-targeted data, and opens the bitmap management area that has become free as a result of the bitmap compression (SP63), and then terminates the procedure RT5 for inter-storage-pool data movement processing shown in FIGS. 16 and 17 (SP64).

Incidentally, this embodiment has been described for the case where the movement-targeted data is moved to the storage pool 19 with a page size value making it where data should be moved. However, this invention is not limited to the above case. For example, if any of the page size values calculated by the optimum page size value calculation processing are not the same as the page size value 42 for the targeted storage pool 19, the page size value change processing may be executed for the targeted storage pool 19 after the movement-targeted data is moved to the storage pool 19 with a page size value making it where data should be moved. Alternatively, if there are plural storage pools 19 each having a page size value making it where data should be moved as a result of the division of the storage pool 19 into 4 parts, the inter-storage-pool data movement processing may be executed more than once. Other various kinds of inter-storage-pool data movement processing may also be employed.

As described above, in the storage system 1, the page size 20, which is the management unit for managing the storage area in the storage pool 19 on a predetermined-area basis, is set for the storage pool 19; the optimum page size value for the targeted storage pool 19 is calculated via analysis of the status of access from the host apparatus 2 for each lapse of the predetermined period or based on the request; and the page size value 42 for the targeted storage pool 19 is changed to the calculated page size value.

Accordingly, the page size value 42 for the targeted storage pool 19 is reset so as to be optimum for the status of data access from the host apparatus 2 to the data. Therefore, the reduced usage efficiency of the storage area in the logical volume, which arises from the increased useless area in the storage area in the logical volume; the insufficiency of the system area which arises from the increased management information for managing the page size; and the reduced performance in the entire storage apparatus in terms of access to the host apparatus which arises from the increased number of accesses to the management information can be prevented effectively.

The invention can be widely used in storage apparatuses that provide a host apparatus with a storage area of which capacity can be dynamically extended.

What is claimed is:

1. A storage apparatus that provides a dynamically extensible virtual volume for a host apparatus that accesses the virtual volume, comprising:
   a management unit setting part for setting a management unit, with which an area for storing data sent from the host apparatus is divided on a predetermined-area basis for management, for a pool area that provides a storage area to be assigned to the virtual volume; and
   a management unit resetting part for resetting the management unit set by the management unit setting part via analysis of the status of access from the host apparatus to the data at a predetermined time to make the management unit optimum for the status of access from the host apparatus to the data.

2. The storage apparatus according to claim 1, wherein:
   the management unit resetting part calculates a management unit optimum for the status of access from the host apparatus to the data; and
   where the calculated management unit is not the same as the management unit set by the management unit setting part; and the number of calculated units is one, the management unit resetting part resets the management unit set by the management unit setting part to the calculated management unit.

3. The storage apparatus according to claim 2, wherein, where the calculated management unit is larger than the management unit set by the management unit setting part, the management unit resetting part resets the management unit set by the management unit resetting part to the calculated management unit, and partially opens a system area for managing the management unit.

4. The storage apparatus according to claim 2, wherein:
where the calculated management unit is smaller than the management unit set by the management unit setting part, the management unit resetting part judges whether or not a system area for managing the management unit is extensible; and
if the system area is extensible, the management unit resetting part resets the management unit set by the management unit setting part to the calculated management unit.

5. The storage apparatus according to claim 1, wherein:
the management unit resetting part calculates a management unit optimum for the status of access from the host apparatus to the data; and
where plural management units are calculated, the management unit resetting part moves movement-targeted data to the existing pool area with a management unit making it where data should be moved.

6. The storage apparatus according to claim 5, wherein, where there is no existing pool area with a management unit making it where data should be moved, the management unit resetting part newly creates a new pool area with a management unit making it where data should be moved.

7. The storage apparatus according to claim 1, wherein the management unit setting part sets the management unit for the pool area based on the management unit for the existing pool area.

8. A management unit setting method for a storage apparatus that provides a dynamically extensible virtual volume for a host apparatus that accesses the virtual volume, comprising:
a first step of setting a management unit, with which an area for storing data sent from the host apparatus is divided on a predetermined-area basis for management, for a pool area that provides a storage area to be assigned to the virtual volume; and
a second step of resetting the management unit set in the first step via analysis of the status of access from the host apparatus to the data at a predetermined time to make the management unit optimum for the status of access from the host apparatus to the data.

9. The management unit setting method according to claim 8, wherein in the second step:
a management unit optimum for the status of access from the host apparatus to the data is calculated; and
if the calculated management unit is not the same as the management unit set in the first step; and the number of calculated units is one, the management unit set in the first step is reset to the calculated management unit.

10. The management unit setting method according to claim 9, wherein in the second step:
if the calculated management unit is larger than the management unit set in the first step, the management unit set in the first step is reset to the calculated management unit, and a system area for managing the management unit is partially opened.

11. The management unit setting method according to claim 9, wherein in the second step:
if the calculated management unit is smaller than the management unit set in the first step, whether or not a system area for managing the management unit is extensible is judged; and
if the system area is extensible, the management unit set in the first step is reset to the calculated management unit.

12. The management unit setting method according to claim 8, wherein in the second step:
a management unit optimum for the status of access from the host apparatus to the data is calculated; and
if plural management units are calculated, movement-targeted data is moved to the existing pool area with a management unit making it where data should be moved.

13. The management unit setting method according to claim 12, wherein, if there is no existing pool area with a management unit making it where data should be moved, a new pool area with a management unit making it where data should be moved is created.

14. The management unit setting method according to claim 8, wherein, in the first step, the management unit for the pool area is set based on the management unit for the existing pool area.

* * * * *